(12) United States Patent
Dow et al.

(10) Patent No.: US 10,044,216 B2
(45) Date of Patent: Aug. 7, 2018

(54) NETWORK PROTOCOL FOR WIFI CHARGING

(71) Applicant: INTERNATIONAL BUSINESS MACHINES CORPORATION, Armonk, NY (US)

(72) Inventors: Eli M. Dow, Wappingers Falls, NY (US); Thomas D. Fitzsimmons, Poughkeepsie, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 15/224,850

(22) Filed: Aug. 1, 2016

(65) Prior Publication Data
US 2018/0034303 A1 Feb. 1, 2018

(51) Int. Cl.
| | |
|---|---|
| *H02J 7/00* | (2006.01) |
| *H02J 7/02* | (2016.01) |
| *H02J 50/12* | (2016.01) |
| *H02J 50/80* | (2016.01) |
| *H04W 84/12* | (2009.01) |

(52) U.S. Cl.
CPC .............. *H02J 7/025* (2013.01); *H02J 50/12* (2016.02); *H02J 50/80* (2016.02); *H04W 84/12* (2013.01)

(58) Field of Classification Search
CPC .......................... B60L 11/182; B60L 11/1829; B60L 11/1831; H02J 50/00–50/90; H02J 5/005
USPC ....... 320/108; 307/104; 455/41.1, 41.2, 572, 455/573
See application file for complete search history.

(56) References Cited

U.S. PATENT DOCUMENTS

| | | | |
|---|---|---|---|
| 7,288,918 B2 | 10/2007 | Distefano | |
| 8,362,745 B2 | 1/2013 | Tinaphong | |
| 8,471,525 B2 | 6/2013 | Kim et al. | |
| 8,660,549 B2 | 2/2014 | Hrabak et al. | |
| 8,676,211 B2 | 3/2014 | Jones et al. | |
| 9,035,602 B2 | 5/2015 | Jing | |
| 2007/0096691 A1 | 5/2007 | Duncan et al. | |
| 2012/0326660 A1* | 12/2012 | Lu ............................ | H02J 17/00 320/108 |
| 2013/0063082 A1* | 3/2013 | Lee .......................... | H02J 7/025 320/108 |
| 2014/0217967 A1* | 8/2014 | Zeine ....................... | H02J 7/025 320/108 |

(Continued)

*Primary Examiner* — Drew A Dunn
*Assistant Examiner* — Zixuan Zhou
(74) *Attorney, Agent, or Firm* — Cantor Colburn LLP (57) ABSTRACT

Embodiments include methods, systems, and computer program products of a Wi-Fi charging system. An example Wi-Fi charging system includes a plurality of chargeable devices (CD) configured to be charged wirelessly. The plurality of chargeable devices is grouped into a fully charged group, and a need-charging group according to a charging status of each of the plurality of chargeable devices respectively. The Wi-Fi charging system also includes at least one access point (AP) that wirelessly charges the chargeable devices using a Wi-Fi communication network. The access point uses a first AP channel to transmit a plurality of data packets to the chargeable devices in the fully charged group, and a second AP channel to transmit a plurality of data packets and a plurality of charging packets to the chargeable devices in the need-charging group.

20 Claims, 5 Drawing Sheets

(56) References Cited

U.S. PATENT DOCUMENTS

2015/0372530 A1  12/2015  Chu

* cited by examiner

NETWORK PROTOCOL FOR WIFI CHARGING

BACKGROUND

The present disclosure relates generally to mobile device charging, and more particularly to methods, systems, and computer program products of network protocol for mobile device charging in a Wi-Fi network.

Researchers at the Korea Advanced Institute of Science and Technology (KAIST) have developed a wireless charging system that can charge around 40 smartphones at a time, from a distance of 5 meters (16 ft). KAIST's prototype can power multiple devices within its range. It can deliver enough electrical energy, the scientists claim, to power many larger devices like fans, TVs, and computers, simultaneously. The technology, commonly known as Dipole Coil Resonant System (DCRS), uses magnetic fields to transfer energy and is based on the Coupled Magnetic Resonance System (CMRS), which was introduced by MIT researchers in 2007. The design of the DCRS addresses a number of fundamental issues that prevented the commercialization of the CMRS, such as a complex coil structure requiring four coils, a bulky size factor, and low transfer efficiency. The DCRS' coil structure consists of two magnetic dipole coils. The primary coil induces the magnetic field and the secondary coil receives electrical energy. Compact in size and scalable, the system is capable of delivering up to 209 W of power at 20 kHz.

This technology can be incorporated into a Wi-Fi communication network, which facilitates a mobile device to communicate wirelessly through an access point. In one or more examples, when the mobile device is in an idle state, or is not accessing the network, the access point sends charging packets to the mobile device that charge the mobile device. In one or more examples, the access point may charge multiple mobile devices in a coverage area of the access point. However, charging the mobile devices may cause the network to slow down, and cause network congestion.

Therefore, heretofore unaddressed needs still exist in the art to address the aforementioned deficiencies and inadequacies.

SUMMARY

In one aspect, the present disclosure relates to a method of charging a device over a Wi-Fi network. The method includes detecting, by a device detection module of a first access point (AP), a plurality of chargeable devices (cd) and at least one AP present in the Wi-Fi network. The method also includes retrieving, by an AP and cd management module of the first AP through a battery management module of each of the plurality of chargeable devices detected, charging status of each of the plurality of chargeable devices detected. The method also includes grouping, by the AP and cd management module of the first AP, each of the plurality of chargeable devices detected into a fully charged group and a need-charging group according to the corresponding charging status of the chargeable devices. The method also includes creating, by the first AP, a first AP channel for transmitting a plurality of data packets to the chargeable devices in the fully charged group. The method also includes creating a second AP channel for transmitting a plurality of data packets and a plurality of charging packets to the chargeable devices in the need-charging group, when no additional access point is detected. The method also includes creating, by the first AP, a first AP group for transmitting the plurality of data packets to the chargeable devices in the fully charged group. The method also includes a second AP group for transmitting the plurality of data packets and the plurality of charging packets to the chargeable devices in the need-charging group, in response to one or more additional access points being detected. The method also includes directing, by a transmission management module of the first AP, the plurality of data packets to the chargeable devices through the first AP channel or the first AP group, and the plurality of data packets and the plurality of charging packets to the chargeable devices through the second AP channel or the second AP group.

In another aspect, the present disclosure relates to a Wi-Fi charging system that includes a plurality of chargeable devices (CD) configured to be charged wirelessly. The chargeable devices are grouped into a fully charged group, and a need-charging group according to a charging status of each of the plurality of chargeable devices respectively. The Wi-Fi charging system also includes at least one access point (AP) that wirelessly charges the chargeable devices using a Wi-Fi communication network. The access point uses a first AP channel to transmit a plurality of data packets to the chargeable devices in the fully charged group, and a second AP channel to transmit a plurality of data packets and a plurality of charging packets to the chargeable devices in the need-charging group.

In yet another aspect, the present disclosure relates to a computer program product operable on a first access point (AP) capable of wirelessly charging a chargeable device over a Wi-Fi communication. The computer program product includes a non-transitory computer storage medium storing an operating system, and computer executable instructions for execution by a processor of the first AP to perform a method for Wi-Fi charging. The method includes detecting, by a device detection module of a first access point (AP), a plurality of chargeable devices (cd) and at least one AP present in the Wi-Fi network. The method also includes retrieving, by an AP and cd management module of the first AP through a battery management module of each of the plurality of chargeable devices detected, charging status of each of the plurality of chargeable devices detected. The method also includes grouping, by the AP and cd management module of the first AP, each of the plurality of chargeable devices detected into a fully charged group and a need-charging group according to the corresponding charging status of the chargeable devices. The method also includes creating, by the first AP, a first AP channel for transmitting a plurality of data packets to the chargeable devices in the fully charged group. The method also includes creating a second AP channel for transmitting a plurality of data packets and a plurality of charging packets to the chargeable devices in the need-charging group, when no additional access point is detected. The method also includes creating, by the first AP, a first AP group for transmitting the plurality of data packets to the chargeable devices in the fully charged group. The method also includes a second AP group for transmitting the plurality of data packets and the plurality of charging packets to the chargeable devices in the need-charging group, in response to one or more additional access points being detected. The method also includes directing, by a transmission management module of the first AP, the plurality of data packets to the chargeable devices through the first AP channel or the first AP group, and the plurality of data packets and the plurality of charging packets to the chargeable devices through the second AP channel or the second AP group.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the present disclosure is particularly pointed out and distinctly claimed in the claims at the conclusion of the specification. The foregoing and other features and advantages of the present disclosure are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

Wi-Fi™ or WiFi™ is a technology that facilitates electronic communication devices to connect to a wireless LAN (WLAN) network, for example using 2.4 gigahertz (12 cm) UHF and 5 gigahertz (6 cm) SHF ISM radio bands. A WLAN is may be password protected, or provide open access. The WLAN facilitates a communication device within a predetermined range to access resources of the WLAN network. The wireless network described throughout this disclosure includes a wireless communication network, such as a Wi-Fi™ network, with charging capability.

The term computer program, as used above, may include software, firmware, and/or microcode, and may refer to programs, routines, functions, classes, and/or objects.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described hereinafter with reference to the accompanying drawings FIGS. 1-4, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1A:
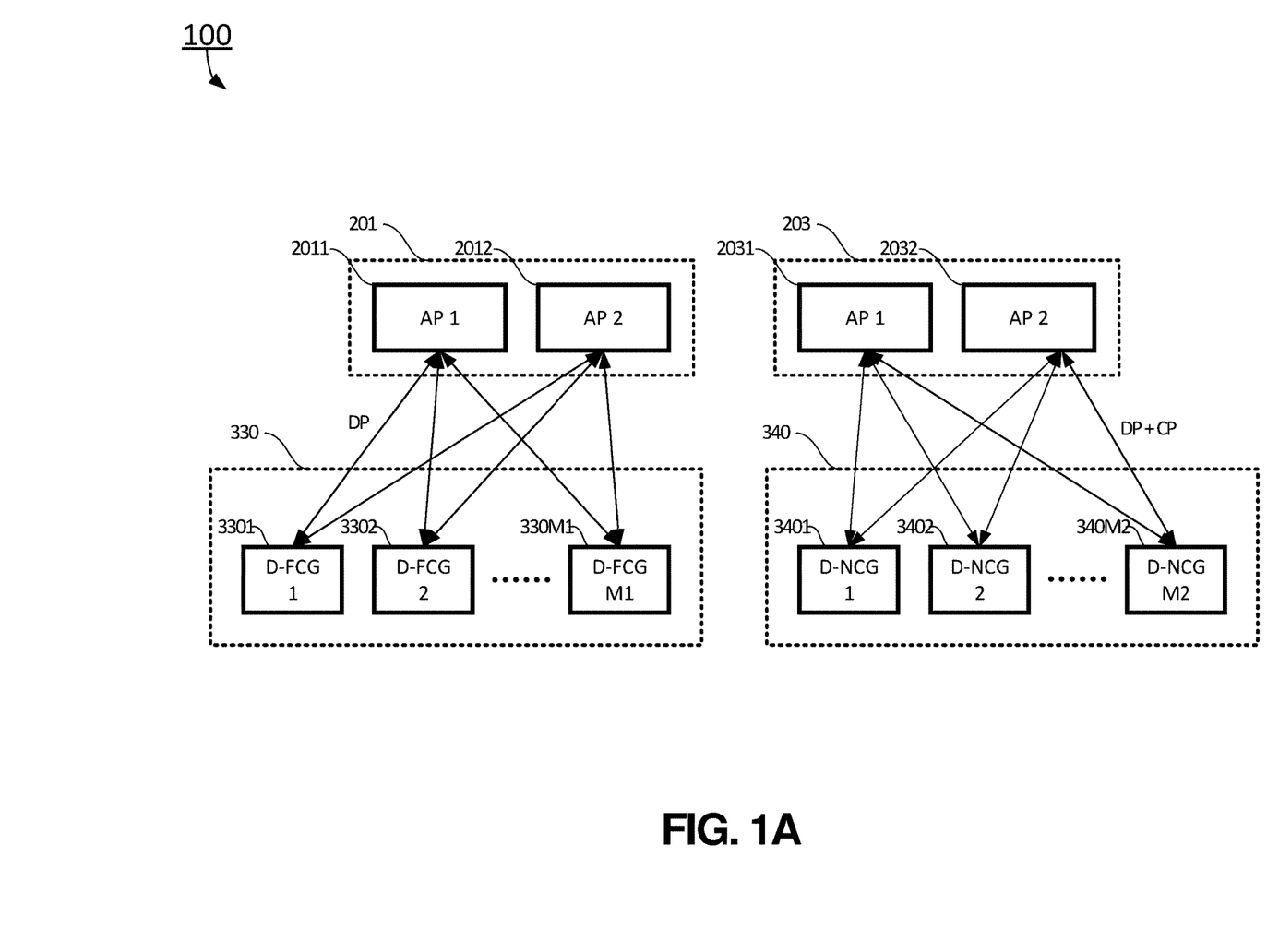
FIG. 1A is a block diagram illustrating an exemplary Wi-Fi charging network having four access points and FIG. 1B is a block diagram illustrating an exemplary Wi-Fi charging network having only one access point according to certain embodiments of the present disclosure.

In one aspect, the present disclosure relates to a Wi-Fi charging system 100 as shown in FIG. 1A. In this embodiment, the Wi-Fi charging system 100 may include M1+M2 chargeable devices (CD), where M1 and M2 are positive integers, and four access points (AP). These M1+M2 chargeable devices are grouped according to a charging status of each of the chargeable devices. For example, in FIG. 1a, the devices are divided into a first group including devices that are fully (illustrated as charged group D-FCG 330), and a second group including devices that are not fully charged (illustrated as charging group D-NCG 340). The fully charged group D-FCG 330 includes a chargeable device that has a fully charged battery. Alternatively or in addition, a chargeable device in the charged group D-FCG 330 indicates a charging status exceeding a first predetermined threshold associated with the chargeable device. For example, the first predetermined threshold may indicate that the battery of the chargeable device is charged at least 95% of the capacity of the battery or any other predetermined capacity level. The need-charging group D-NCG 340 includes a chargeable device that needs to be charged further. For example, the chargeable device of the need-charging group D-NCG 340 indicates a charging status below a second predetermined threshold associated with the chargeable device. For example, the second predetermined threshold may be indicative that the battery of the chargeable device is below 15% capacity of the battery or any other predetermined capacity level.

As illustrated, the fully charged group D-FCG 330 may include chargeable devices D-FCG-1 (3301), D-FCG-2 (3302), . . . , and D-FCG-M1 (330M1), and the need-charging group D-NCG 340 may include chargeable devices D-NCG-1 (3401), D-NCG-2 (3402), . . . , and D-NCG-M2 (340M2). The chargeable devices receive Wi-Fi charging packets wirelessly from an access point and in response, charge the respective batteries.

In the illustrated example of FIG. 1A, the access points (AP) is divided into a first AP group 201 (that includes access points AP 2011, and AP 2012), and a second AP group 203 (that includes access points AP 2031, and AP 2032). The access points provide wireless charging packets to the chargeable devices over a Wi-Fi network. The two AP groups send packets to the chargeable devices in a balanced manner. For example, two AP groups facilitate sending the data packets to the chargeable devices that do not need to be charged, and provide data packets and charging packets to the chargeable devices that need to be charged. As shown in FIG. 1A, the traffic between the first AP group 201 and the fully charged group D-FCG 330 is denoted as data packets (DP) traffic, and the traffic between the second AP group 203 and the need-charging group D-NCG 340 is denoted as data packets (DP) traffic and charging packets (CP) traffic (DP+CP).

Figure 1B:
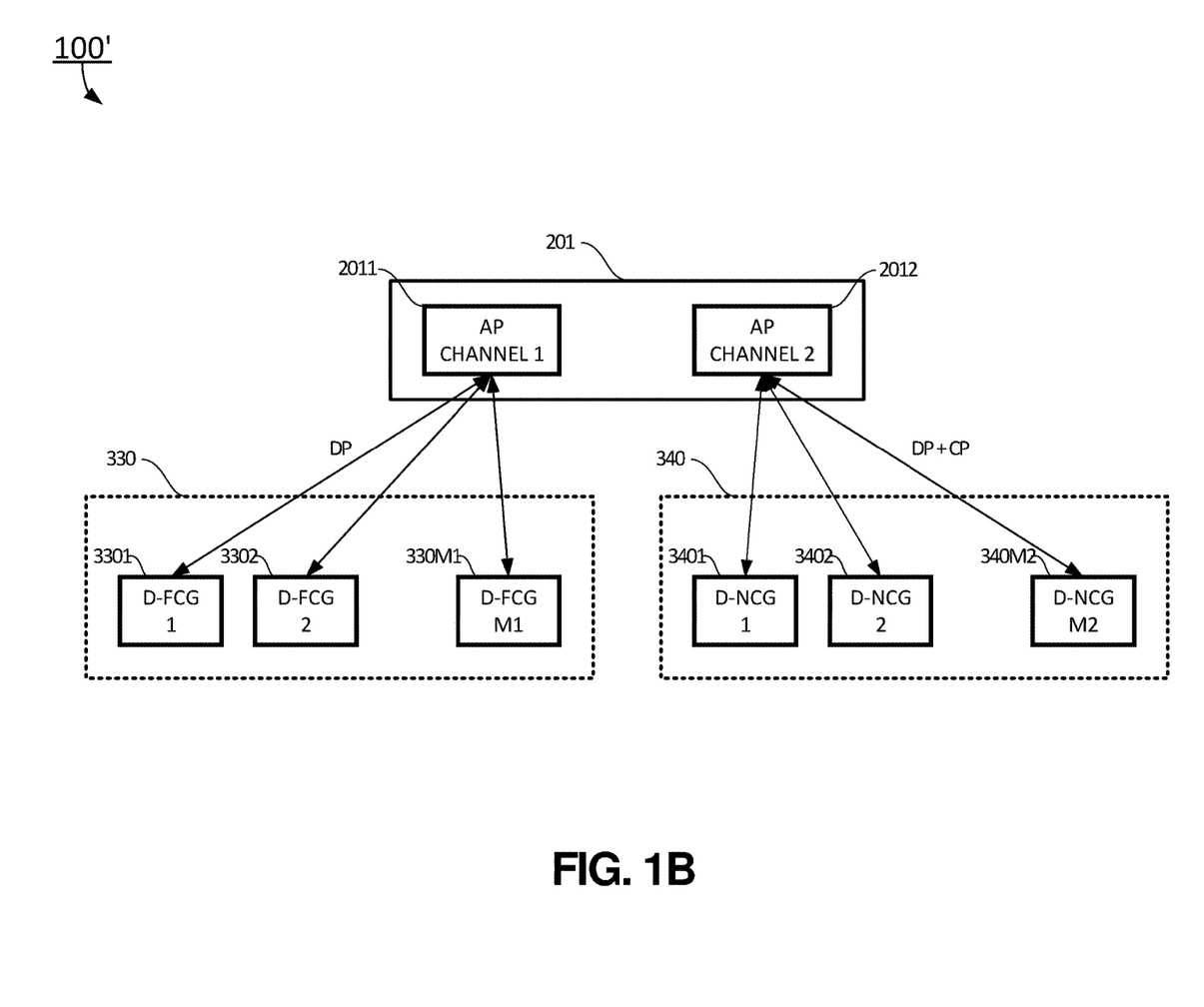

In one or more examples, as shown in FIG. 1B, only one access point 201 is present in the Wi-Fi network. In such cases, the access point 201 uses a first AP channel 2011 to deliver the data packets (DP) traffic to the chargeable devices in the fully charged group D-FCG 330. Further, the AP 201 uses a second AP channel 2012 to deliver the data packets (DP) traffic and the charging packets (CP) traffic to the chargeable devices in the need-charging group D-NCG 340. The AP 201 uses the two separate AP channels to provide balanced data packets traffic to those chargeable devices that do not need to be charged, and provide data traffic and charging packets traffic to those chargeable devices that need to be charged. As shown in FIG. 1B, the traffic between the AP 201 and the fully charged group D-FCG 330 using the first AP channel 2011 is denoted as data packets (DP) traffic. Further, the traffic between the AP 201 and the need-charging group D-NCG 340 using the second AP channel 2012 is denoted as data packets (DP) traffic and charging packets (CP) traffic (DP+CP).

Figure 2:
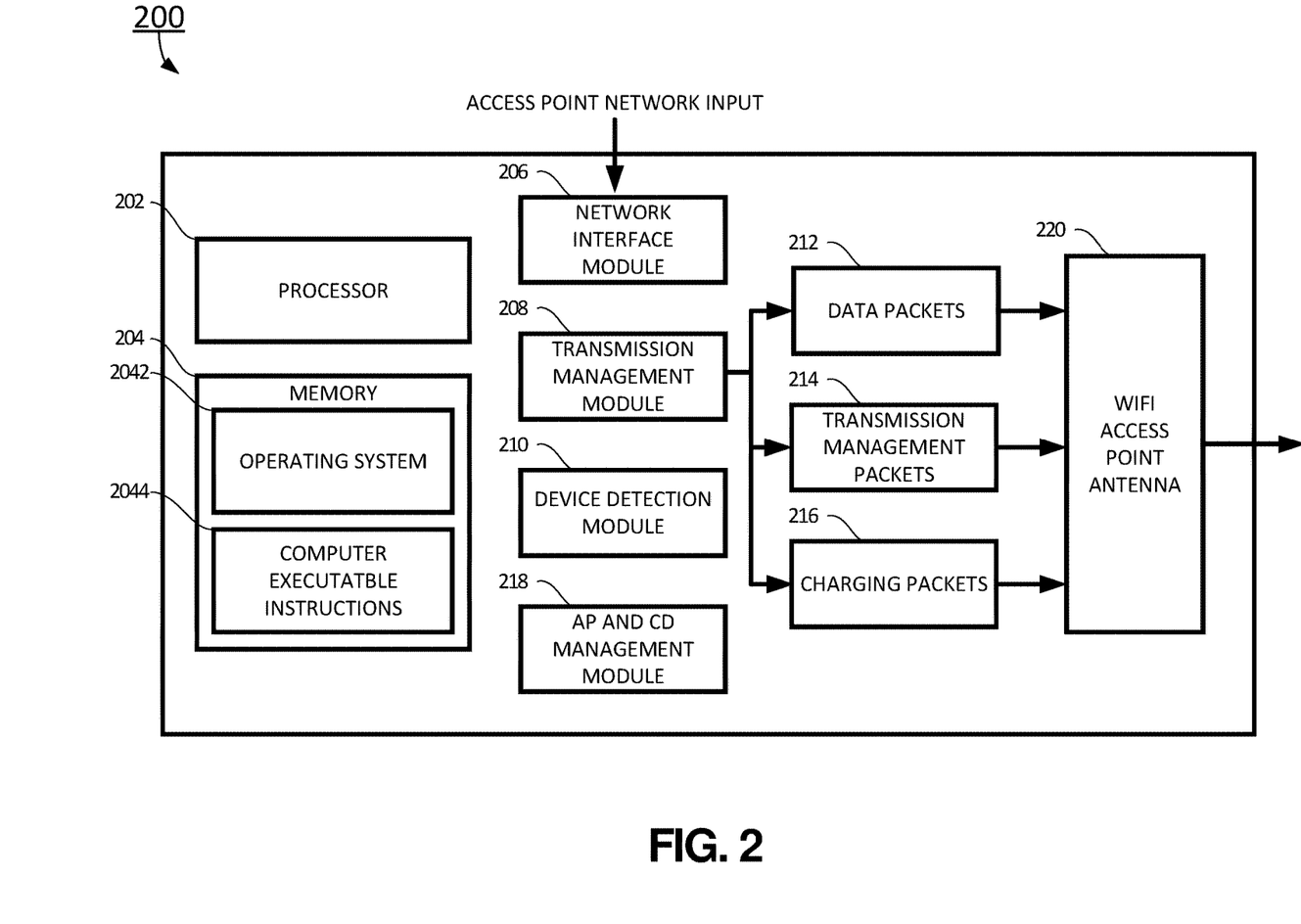
FIG. 2 is a block diagram illustrating an exemplary access point having Wi-Fi charging capability according to certain embodiments of the present disclosure.

Referring now to FIG. 2, a block diagram illustrating an exemplary access point (AP) 200 that provides Wi-Fi charging packets is shown. In certain embodiments, the AP 200 may include a processor 202, a memory 204, a network interface module 206, a device detection module 210, an AP and CD management module 218, a transmission management module 208, and a Wi-Fi access point antenna 220. The processor 202 may perform various operations of the AP 200 including transmission of Wi-Fi charging packets to the chargeable devices. The memory 204 may be a non-transitory computer storage medium and may store an operating system 2042 and other computer executable instructions 2044 for the processor to perform the various operations of the AP 200.

In certain embodiments, the network interface module 206 may provide network data access to the AP. The device detection module 210 may detect any access points and any chargeable devices present within the Wi-Fi network. In one embodiment, at the initiation of the Wi-Fi network, the device detection module 210 detects chargeable devices (CDs) and other access points (APs) present in the Wi-Fi network. Alternatively or in addition, the device detection module 210 discovers CDs or other APs periodically and facilitates for the CDs and APs to join the Wi-Fi network after the Wi-Fi network was started. In certain embodiments, the device detection module 210 may also be used to delete or remove any chargeable devices from either the fully charged group 330 or the need-charging group 340. In certain embodiments, the device detection module 210 may also be used to delete or remove any access points that ceased operations.

The AP and CD management module 218 may receive the charging status of a chargeable device when the chargeable device is detected or discovered within the Wi-Fi network. Based on the charging status of the AP and CD management module 218 categorizes the chargeable device into the fully charged group D-FCG 330 or the need-charging group D-NCG 340 as shown in FIGS. 1A and 1B. The AP and CD management module 218 categorizes multiple chargeable devices according to the respective charging status of the chargeable devices.

In certain embodiments, the transmission management module 208 may be used to deliver and receive data packets 212, transmission management packets 214, and the charging packets 216 to and from any of the chargeable devices present in the Wi-Fi network. The transmission management module 208 may transmit/receive the packets using the Wi-Fi access point antenna 220. The data packets 212 provide network data communication to the chargeable devices in both the fully charged group (D-FCG) 330 and the need-charging group (D-NCG) 340. The transmission management packets 214 may be used to request and receive the charging status of chargeable devices respectively. The transmission management module 208 receives the charging status from the chargeable devices in the Wi-Fi network irrespective of the group. The access point 200 groups the chargeable devices into the fully charged group D-FCG 330 and the need-charging group (D-NCG) 340 based on the respective charging status. The AP 200 further directs the data packets 214 to the fully charged group D-FCG 330 and the need-charging group D-NCG 340. Further, the AP 200 directs the charging packets 216 only to the need-charging group D-NCG 340. In certain embodiments, when the data packets 212 are directed to a chargeable device in the need-charging group D-NCG 340, the transmission of the charging packets 216 is halted until the data packets 212 are delivered to the chargeable device. When the chargeable device in the need-charging group D-NCG 340 is in an idle state, for example with no data packet transmission, the charging packets 216 may be transmitted at full strength to each of the chargeable devices in the need-charging group (D-NCG) 340.

Figure 3:
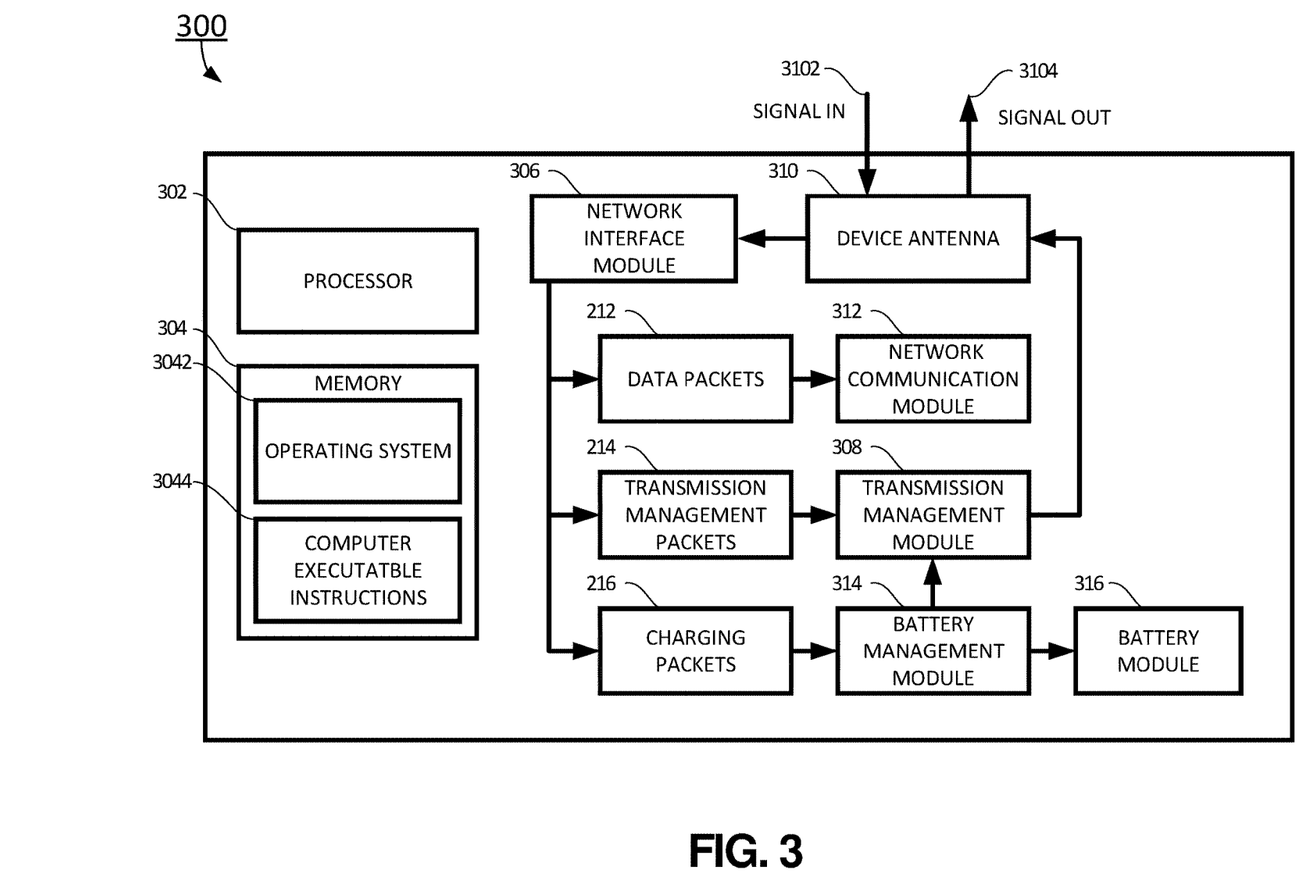
FIG. 3 is a block diagram illustrating an exemplary chargeable device having Wi-Fi charging capability according to certain embodiments of the present disclosure.

Referring now to FIG. 3, a block diagram illustrating an exemplary chargeable device 300 having Wi-Fi charging capability is shown according to certain embodiments of the present disclosure. In certain embodiments, the chargeable device 300 may be a mobile phone, a smart phone, a smart thermostat, a sensor, a Wi-Fi camera, a router, a biochip transponder, a device that communicates using internet of things, and any combination of such devices. In certain embodiments, the chargeable device 300 includes a rechargeable battery and hardware to receive charging packets in a Wi-Fi manner, where the charging packets recharge the battery.

In certain embodiments, the CD 300 may include: a processor 302, a memory 304, a network interface module 306, a device antenna 310, a transmission management module 308, a network communication module 312, a battery management module 314, and a battery module 316. The processor 302 may perform various operations of the CD 300 including charging the battery module using charging packets received wirelessly, such as across a Wi-Fi™ network. The memory 304 may be a non-transitory computer storage medium and may store an operating system 3042 and other computer executable instructions 3044 for the processor 302 to perform the various operations of the CD 300.

The network communication module 312 may provide network data access to the CD 300. For example, the device antenna 310 receives/transmits communication packets. In certain embodiments, the network interface module 306 may receive the data packets 212, the transmission management packets 214, and the charging packets 216 from the access point 200. The network interface module 306 delivers the data packets 212 to the network communication module 312. Further, the network interface module 306 delivers the transmission management packets 214 to the transmission management module 308. Further, the network interface module 306 delivers the charging packets 216 to the battery management module 314 and/or the battery module 316.

In certain embodiments, the transmission management module 308 may manage packets transmission of the CD 300. In certain embodiments, at the request from the access point 200, the transmission management module 308 make inquire about the charging status of the CD 300 and report the charging status of the CD 300 to the access point 200 through the device antenna 310.

In certain embodiments, the battery management module 314 may check the charging status of the CD 300 and report the charging status of the CD 300 to the access point 200 through the transmission management module 308 and the device antenna 310. In one embodiment, the charging status of the CD 300 may be reported as charging percentage, for example, 10% charged, 30% charged, or 100% charged. In another embodiment, the charging status of the CD 300 may be reported as a binary result: either charged or need charging, based on a predetermined threshold, such as 95% or any other such threshold. For example, if the charging status of the CD 300 is at 30%, i.e. below the predetermined threshold, the charging status of the CD 300 is reported as need charging. Further, if the charging status of the CD 300 is at 98%, i.e. above the predetermined threshold, then the charging status of the CD 300 is reported as charged. The access point 200 may use the charging status of the CD 300 received from the CD 300 to categorize the CD 300 into either the fully charged group D-FCG 330 or the need-charging group D-NCG 340.

In certain embodiments, the battery management module 314 may charge the battery module 316 of the CD 300. In one embodiment, the battery module 316 is charged using wireless charging infrastructure built into the battery module 316. In certain embodiments, the battery module 316 is charged using Dipole Coil Resonant System (DCRS), which uses magnetic fields to transfer energy and is based on the Coupled Magnetic Resonance System (CMRS).

In certain embodiments, the device antenna 310 may receive a signal from the access point 200 via a signal-in terminal 3102, and transmit a signal to the access point 200 via a signal-out terminal 3104. In certain embodiments, the signals through the device antenna 310 may include analog signals and digital signals. The digital signals may include the data packets 212, the transmission management packets 214, and the charging packets 216.

Figure 4:
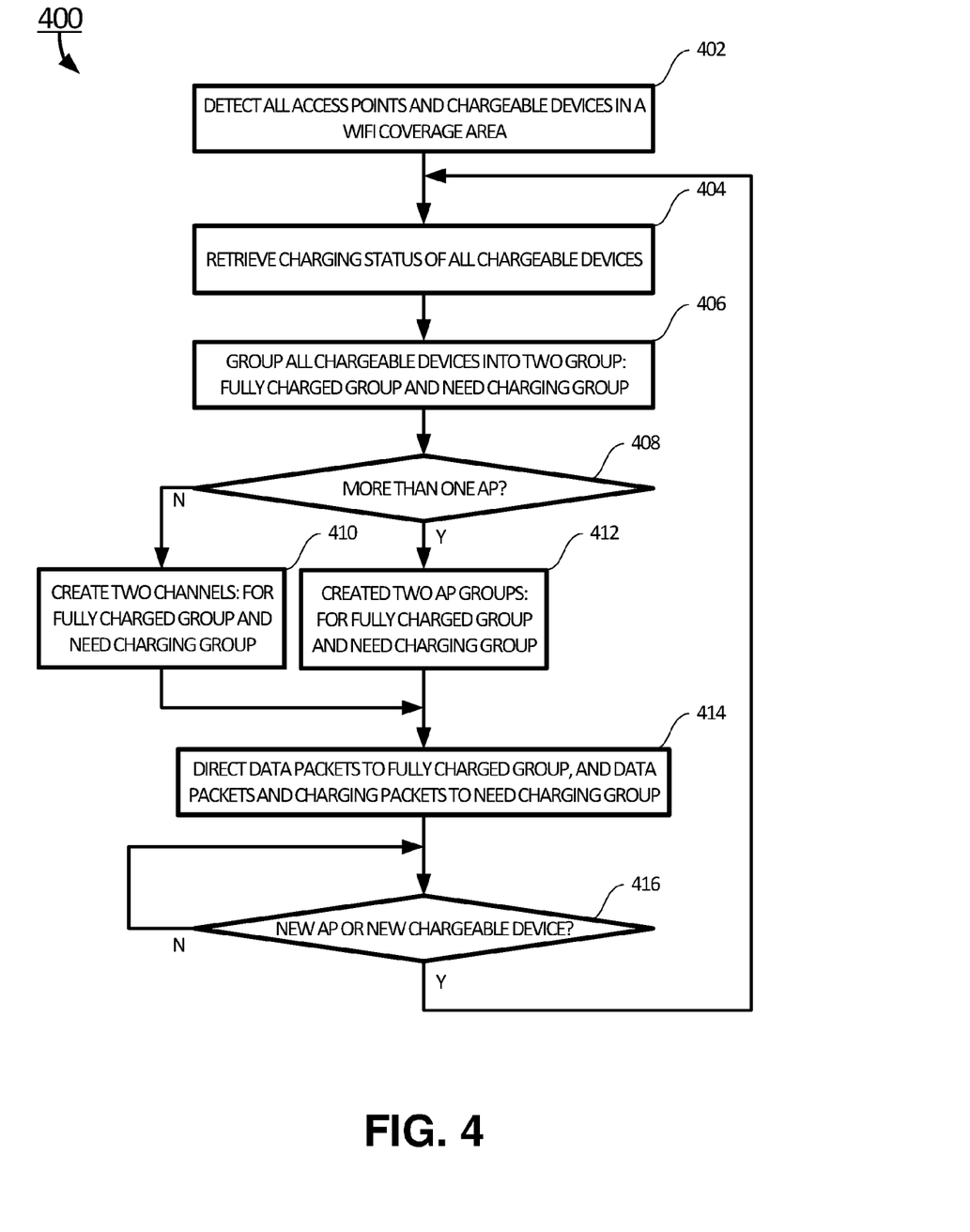
FIG. 4 is a flowchart of an exemplary method of charging chargeable devices over the access points within a Wi-Fi network according to certain embodiments of the present disclosure.

In another aspect, the present disclosure relates to a method 400 of device charging over a Wi-Fi network as shown in FIG. 4 according to certain embodiments of the present disclosure.

At block 402, the device detection module 210 of a first access point (AP) 200, which is part of a Wi-Fi network, may detect one or more chargeable devices (CDs) associated with the Wi-Fi network. The AP 200 further detects one or more additional APs of the Wi-Fi network. Such detection may be performed on an ongoing basis. For example, the device detection module 210 may perform detection of the CDs and the APs periodically to detect any CDs that moved in and out of the Wi-Fi network, and any APs that switched in and out of service. The wireless network may be a WI-FI™ network.

At block 404, the AP and CD management module 218 of the first AP 200 may request the battery management module 314 of one or more CDs detected to report the charging status of the CDs. In certain embodiments, the AP and CD management module 218 may receive the charging status of each of the CDs detected. For example, the AP and CD management module 218 receives the charging status via the transmission management module 308 of the CDs.

At block 406, the AP and CD management module 218 of the first AP 200 may categorize the one or more CDs detected into the fully charged group D-FCG 330 and the need-charging group D-NCG 340 according to the corresponding charging status of the CDs. The CDs that are fully charged may be grouped into the fully charged group D-FCG 330. The CDs that need charging may be grouped into the need-charging group D-NCG 340.

At query block 408, the first AP 200 may check whether there are other access points present in the wireless network. When there is at least one additional AP, the method 400 proceeds to block 412. Otherwise, the method 400 proceeds to block 410.

At block 410, when no additional AP exists in the Wi-Fi network, the first AP 200 creates a first AP channel for transmitting the data packets 212 to the CDs in the fully charged group D-FCG 330, and a second AP channel for transmitting the data packets 212 and the charging packets 216 to the CDs in the need-charging group D-NCG 340. In one or more examples, the first AP 200 creates multiple first AP channels and/or multiple second AP channels.

At block 412, when at least one additional AP is found in the Wi-Fi network, the first AP 200 may categorize the APs. Consider the example of FIG. 1A with four APs. In such exemplary case, the first AP 200 creates a first AP group 201 including the AP 2011 and the AP 2012 for transmitting the data packets 212 to the CDs in the D-FCG 330. The first AP 200 further creates a second AP group 203 for transmitting the data packets 212 and the charging packets 216 to the CDs in the D-NCG 340. In certain embodiments, the two AP groups 201 and 203 facilitate balancing transmission of the packets and preventing congestion among the chargeable devices in the Wi-Fi network.

At block 414, the transmission management module of the first AP 200 may direct the data packets 212 to the CDs in the fully charged group D-FCG 330 through the first AP channel or the first AP group. Further, the first AP 200 directs the data packets 212 and the charging packets 216 to the CDs in the need-charging group D-NCG 340 through the second AP channel or the second AP group.

In certain embodiments, when the data packets 212 are directed to a CD in the need-charging group D-NCG 340, the transmission of the charging packets 216 is halted until the data packets 212 are delivered to the CD. When the CD in the need-charging group D-NCG 340 is in an idle state with no data packet transmission, the charging packets 216 may be transmitted in full strength to each of the CDs in the need-charging group (D-NCG) 340.

At query block 416, the device detection module 210 of the first AP 200 may periodically detect any CDs and APs associated with the Wi-Fi network. The device detection module 210 may perform detection of CDs and APs to detect any CDs that moved in and/or out of the Wi-Fi network. The device detection module may further identify whether other APs switched in and/or out of service. When no new CDs or APs is found, the method may loop back to the query block 416. If a new CD or AP is found, the method may proceed to block 404 to retrieve the charging status of the CD found and categorize the CD into the fully charged group D-FCG 330, or the need-charging group D-NCG 340. Alternatively or in addition, if a new AP is found, the method proceeds to update the first AP group 201, and/or the second AP group 203. The wireless charging continues according to the method described above after the update.

In yet another aspect, the present disclosure relates to a computer program product operable on a first AP 200 that facilitates wireless charging. The computer program product may include a non-transitory computer storage medium 204 storing an operating system 2042, and computer executable instructions 2044 for execution by a processor 202 of the first AP 200. The computer executable instructions may facilitate performing a method for wirelessly charging one or more chargeable device within a predetermined range of the AP 200. In certain embodiments, the method may include detecting one or more chargeable devices (CD) within the predetermined range of the AP 200. The method may further include detecting one or more additional APs associated with the Wi-Fi network. The method may further include retrieving a charging status of each of the CDs. For example, the charging status may be received from the battery management module 314 of each of the CDs. The method may further include grouping the CDs into a fully charged group D-FCG 330 and a need-charging group D-NCG 340 according to the corresponding charging status of the CDs.

In case the AP 200 is the sole AP in the Wi-Fi network, the method may further include creating a first AP channel for transmitting data packets 212 to the CDs in the fully charged group D-FCG 330, and a second AP channel for transmitting data packets 212 and charging packets 216 to the CDs in the need-charging group D-NCG 340. Alternatively, if the Wi-Fi network includes additional APs, the method further includes creating a first AP group 201 for transmitting data packets 212 to the CDs in the fully charged group D-FCG 330, and creating a second AP group 203 for transmitting data packets 212 and charging packets 216 to the CDs in the need-charging group D-NCG 340. The method further includes directing the data packets 212 to the CDs through the first AP channel or the first AP group. The method further includes directing the data packets 212 and the charging packets 216 to the CDs through the second AP channel or the second AP group.

The present disclosure may be a computer system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a Wi-Fi network. The network may comprise copper transmission cables, optical transmission fibers, Wi-Fi transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of charging a device over a Wi-Fi network, the method comprising:
   detecting, by a device detection module of a first access point (AP), a plurality of chargeable devices (CD) and at least one AP present in the Wi-Fi network;
   retrieving, by an AP and CD management module of the first AP through a battery management module of each of the plurality of chargeable devices detected, charging status of each of the plurality of chargeable devices detected;
   grouping, by the AP and CD management module of the first AP, each of the plurality of chargeable devices detected into a fully charged group and a need-charging group according to a corresponding charging status of each of the plurality of chargeable devices;
   creating, by the first AP, a first AP channel for only transmitting a plurality of data packets to the chargeable devices in the fully charged group, and creating a second AP channel for transmitting a plurality of data packets and a plurality of charging packets to the chargeable devices in the need-charging group, when no additional access point is detected;
   creating, by the first AP, a first AP group for only transmitting the plurality of data packets to the chargeable devices in the fully charged group, and a second AP group for transmitting the plurality of data packets and the plurality of charging packets to the chargeable devices in the need-charging group, in response to one or more additional access points being detected; and
   directing, by a transmission management module of the first AP, the plurality of data packets to the chargeable devices through the first AP channel or the first AP group, and the plurality of data packets and the plurality of charging packets to the chargeable devices through the second AP channel or the second AP group.

2. The method of claim 1, wherein the AP comprises:
   a processor configured to perform a plurality of operations of the AP;
   a memory storing an operating system and computer executable instructions for the processor;
   a network interface module configured to provide network data access to the AP and manage packets transmission of the AP among the APs and the CDs within the Wi-Fi network;
   the device detection module;
   the access point (AP) and chargeable device (CD) management module; and
   a transmission management module configured to deliver the plurality of data packets, a plurality of transmission management packets, and the plurality of charging packets.

3. The method of claim 1, wherein the chargeable device is a device from a group of devices consisting of:
   a mobile phone;
   a smartphone;
   a smart thermostat;
   a sensor;
   a Wi-Fi camera;
   a router;
   a biochip transponder;
   a combination thereof, and
   wherein the chargeable device comprises a rechargeable battery.

4. The method of claim 2, wherein the chargeable device (CD) comprises:
   a processor configured to perform a plurality of operations of the CD;
   a memory storing an operating system and computer executable instructions for the processor;

a network communication module configured to provide network data access to the CD;
a transmission management module configured to manage packet transmission of the CD;
a battery management module configured to report the charging status of the CD; and
a network interface module configured to receive the plurality of data packets, the plurality of transmission management packets, and the plurality of charging packets.

5. The method of claim 1, further comprising halting the transmission of the plurality of charging packets until the plurality of data packets is delivered to the chargeable device when a plurality of data packets is being delivered to a chargeable device in the need-charging group through the second AP channel or the second AP group.

6. The method of claim 5, further comprising, transmitting the plurality of charging packets to the chargeable device through the second AP channel or the second AP group when the chargeable device in the need-charging group is an idle state of no data packet transmission.

7. The method of claim 1, wherein in response to detecting more than one access points in the Wi-Fi network, selecting another access point from the detected access points as the first AP.

8. A Wi-Fi charging system, comprising:
a plurality of chargeable devices (CD) configured to be charged wirelessly, wherein the chargeable devices are grouped into a fully charged group, and a need-charging group according to a charging status of each of the plurality of chargeable devices respectively; and
at least one access point (AP) that wirelessly charges the chargeable devices using a Wi-Fi communication network, wherein the access point uses a first AP channel to only transmit a plurality of data packets to the chargeable devices in the fully charged group, and a second AP channel to transmit a plurality of data packets and a plurality of charging packets to the chargeable devices in the need-charging group.

9. The Wi-Fi charging system of claim 8, wherein, in response to two or more access points being present in the Wi-Fi communication network, the access points are divided into a first AP group to transmit the plurality of data packets to the chargeable devices in the fully charged group, and a second AP group to transmit the plurality of data packets and the plurality of charging packets to the chargeable devices in the need-charging group.

10. The Wi-Fi charging system of claim 9, wherein when a plurality of data packets is to be delivered to a chargeable device in the need-charging group through the second AP channel or the second AP group, transmission of the plurality of charging packets is halted until the plurality of data packets is delivered to the chargeable device, and wherein when the chargeable device is idle with no data packet transmission, the plurality of charging packets is to be transmitted in full strength to each of the chargeable devices in the need-charging group through the second AP channel or the second AP group.

11. The Wi-Fi charging system of claim 8, wherein the AP comprises:
a processor;
a memory;
a network interface module configured to provide network data access to the AP;
a device detection module configured to detect the access points and any chargeable devices within the Wi-Fi communication network;
an access point (AP) and chargeable device (CD) management module configured to receive a charging status of the plurality of chargeable devices; and
a transmission management module configured to deliver the plurality of data packets, a plurality of transmission management packets, and the plurality of charging packets to the plurality of chargeable devices.

12. The Wi-Fi charging system of claim 8, wherein the chargeable device is a device from a group of devices consisting of:
a mobile phone;
a smartphone;
a smart thermostat;
a sensor;
a Wi-Fi camera;
a router;
a biochip transponder;
any combinations thereof, and
wherein the chargeable devices comprises a rechargeable battery.

13. The Wi-Fi charging system of claim 9, wherein the chargeable device (CD) comprises:
a processor;
a memory;
a network communication module configured to provide network data access to the CD;
a transmission management module configured to manage packets transmission of the CD;
a battery management module configured to report the charging status of the CD; and
a network interface module configured to receive the plurality of data packets, a plurality of transmission management packets, and the plurality of charging packets.

14. A computer program product operable on a first access point (AP) capable of wirelessly charging a chargeable device over a Wi-Fi communication network, the computer program product comprising a non-transitory computer storage medium storing an operating system, and computer executable instructions for execution by a processor of the first AP to perform a method for Wi-Fi charging, the method comprising:
detecting, by a device detection module of a first access point (AP), a plurality of chargeable devices (CD) and at least one AP present in the Wi-Fi network;
retrieving, by an AP and CD management module of the first AP through a battery management module of each of the plurality of chargeable devices detected; charging status of each of the plurality of chargeable devices detected;
grouping, by the AP and CD management module of the first AP, each of the plurality of chargeable devices detected into a fully charged group and a need-charging group according to a corresponding charging status of each of the plurality of chargeable devices;
creating, by the first AP, a first AP channel for only transmitting a plurality of data packets to the chargeable devices in the fully charged group, and creating a second AP channel for transmitting a plurality of data packets and a plurality of charging packets to the chargeable devices in the need-charging group, when no additional access point is detected;
creating, by the first AP, a first AP group for only transmitting the plurality of data packets to the chargeable devices in the fully charged group, and a second AP group for transmitting the plurality of data packets and the plurality of charging packets to the chargeable devices in the need-charging group, in response to one or more additional access points being detected; and directing, by a transmission management module of the first AP, the plurality of data packets to the chargeable devices through the first AP channel or the first AP group, and the plurality of data packets and the plurality of charging packets to the chargeable devices through the second AP channel or the second AP group.

15. The computer program product of claim 14, wherein the chargeable device is a device from a group consisting of:
- a mobile phone;
- a smartphone;
- a smart thermostat;
- a sensor;
- a Wi-Fi camera;
- a router;
- a biochip transponder; and
- any combinations thereof, wherein the chargeable device comprises a rechargeable battery.

16. The computer program product of claim 14, wherein the AP comprises:
- a processor;
- a memory;
- a network interface module configured to provide network data access to the AP;
- the device detection module configured to detect any access points and any chargeable devices within the Wi-Fi communication network;
- the access point (AP) and chargeable device (CD) management module configured to receive charging status of the one or more chargeable devices; and
- a transmission management module configured to deliver the plurality of data packets, a plurality of transmission management packets, and the plurality of charging packets to the one or more chargeable devices via the Wi-Fi communication network.

17. The computer program product of claim 15, wherein the chargeable device (CD) comprises:
- a processor;
- a memory;
- a network communication module configured to provide network data access to the CD;
- a transmission management module configured to manage packets transmission of the CD;
- a battery management module configured to report the charging status of the CD; and
- a network interface module configured to receive the plurality of data packets, a plurality of transmission management packets, and the plurality of charging packets.

18. The computer program product of claim 14, wherein the method further comprises halting the transmission of the plurality of charging packets until the plurality of data packets is delivered to a chargeable device in the need-charging group in response to a plurality of data packets being delivered to the chargeable device through the second AP channel or the second AP group.

19. The computer program product of claim 18, wherein the method further comprises transmitting the plurality of charging packets to the chargeable device through the second AP channel or the second AP group in response to the chargeable device in the need-charging group being in an idle with no data packet transmission.

20. The computer program product of claim 14, wherein the method further comprises, in response to detecting more than one access points in the Wi-Fi communication network, selecting a first AP from the detected access points.

\* \* \* \* \*